Sept. 8, 1936. J. H. HUMBERSTONE ET AL 2,053,956
WELDING ELECTRODE
Filed March 21, 1935
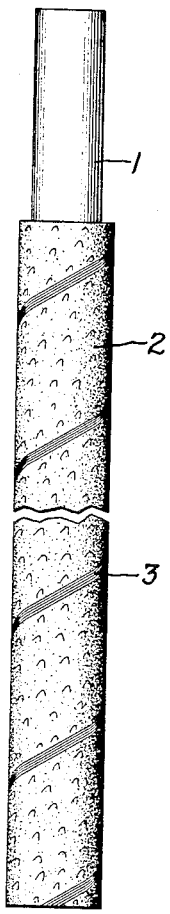
Inventors:
Joseph H. Humberstone,
Virdis Miller,
by Harry E. Dunham
Their Attorney.

Patented Sept. 8, 1936

2,053,956

UNITED STATES PATENT OFFICE 2,053,956

WELDING ELECTRODE

Joseph H. Humberstone and Virdis Miller, Schenectady, N. Y., assignors to General Electric Company, a corporation of New York Application March 21, 1935, Serial No. 12,175

5 Claims. (Cl. 219—8)

Our invention relates to electrodes used in metallic arc welding.

In metallic arc welding an arc is maintained between the work to be welded and a rod, wire or strip of metal usually referred to as an electrode. During welding the electrode is fused or vaporized or both and the metal thereof deposited upon and welded to the work as the electrode is fed toward the work to maintain the arc.

The arcing characteristics of the electrode and the quality of the weld metal deposited thereby depends to a large extent upon the influence of certain elements or compounds associated therewith, usually in the form of a coating. Electrodes so coated are commonly referred to as flux coated electrodes.

There are various types of flux coated electrodes. The coating is sometimes of inappreciable thickness and during welding is dissipated so that there is no apparent slag deposit on the weld metal. Some coatings are of appreciable thickness but do not form on the weld a slag deposit of any great thickness. Other coatings are of considerable thickness and form on the weld during the welding operation a slag deposit of substantial thickness which adequately protects it from the deleterious effects of the surrounding atmosphere and aids in the refinement of the weld metal. Such heavy coatings also form a shielding crater around the arcing terminal of the electrode which not only directs the arc but materially assists in projecting the molten electrode material toward the weld while protecting it from the surrounding atmosphere.

Our present invention is primarily directed to heavy coated electrodes, but is not limited in its application thereto.

It is an object of our invention to provide an improved flux coated electrode.

It is a further object of our invention to provide an electrode suitable for producing welds of exceptional quality in the flat, vertical and overhead positions when using direct current with the electrode connected to the positive terminal of the source of supply.

It is another object of our invention to provide an electrode which operates with a confined arc having excellent penetrating qualities.

Further objects of our invention will appear from the following description taken in connection with the accompanying drawing which illustrates a heavy coated electrode.

In the manufacture of electrodes in accordance with one embodiment of our invention we use a flux paste of substantially the following composition:

| | Per cent by weight |
|---|---|
| Titanium dioxide | 12 |
| Sodium silicate glass | 15 |
| Vermont talc | 7 |
| Asbestos | 5 |
| Amorphous silica | 5 |
| Gum arabic | 5 |
| Ferromanganese | 10 |
| Liquid sodium silicate | 24 |
| Water | 17 |

We use a commercial grade of titanium dioxide, although rutile may be used. The sodium silicate glass contains 66% silicate and 33% soda. The talc is of a grade known to the trade as "plain Vermont talc", and has substantially the following composition:

| | Per cent by weight |
|---|---|
| $SiO_2$ | 29.00 |
| $Al_2O_3 + Fe_2O_3$ | 9.21 |
| CaO | Trace |
| MgO | 36.5 |
| $H_2O$ | 3.56 |
| $CO_2$ | 21.65 |

It will be noted that there is a large percentage of magnesium carbonate in this talc. The asbestos used is a short fibrous material having the following composition:

| | Per cent by weight |
|---|---|
| $SiO_2$ | 56.54 |
| $Fe_2O_3 + Al_2O_3$ | 1.04 |
| MnO | Trace |
| CaO | 6.25 |
| $CO_2$ | .83 |
| MgO | 30.74 |
| Ignition loss | 4.60 |

It is also referred to as a short fiber talc. The liquid sodium silicate has a specific gravity of 40° Baumé and has one part soda to 3.25 parts silica. The solid matter in the liquid sodium silica amounts to about 36% of the total weight thereof.

The electrode illustrated in the drawing comprises a metallic core 1 having a flux coating 2 of the nature above described. This flux has been applied to the core of the electrode in conjunction with a coating of cellulosic material which is impregnated therewith. This cellulosic material may be a tape of cotton fabric which is folded longitudinally about the core of the electrode with its edges abutting one another and parallel to the axis thereof as described and claimed in the copending application of one of us, Joseph H. Humberstone, Serial No. 648,651 filed December 23, 1932 for Welding electrodes, and assigned to the same assignee as the present application. The tape is usually applied to the core of the electrode so as to obtain a substantial layer of flux between it and the core of the electrode. In the process of manufacturing such an electrode it has been found desirable to hold the tape to the core of the electrode by means of a helical binding 3 which as a part of the electrode, also prevents the coating from warping or separating therefrom when exposed to weather conditions.

Instead of the tape above referred to various other forms of cellulosic material may be used to form a part of the flux coating. It may be present in the flux as a comminuted material such as wood-flour or similar organic material. When so used the flux paste may readily be extruded onto the core rod in the manufacture of the electrode. It may also appear in the flux coating as a cord or cords applied longitudinally of the electrode or wrapped spirally thereabout. The longitudinal cords or turns of a spiral wrapping are preferably separated from one another in order to provide adequate space for the other ingredients of the flux coating which may be extruded thereon during or after the cord or cords have been applied to the core rod. The cellulosic material may form from 15% to 25% of the total weight of the flux coating on the electrode. During welding this cellulosic material burns liberating shielding gases about the arc and molten weld metal. The gum arabic present in the flux paste also burns liberating shielding gases. Its principal purpose, however, is to act as a binder in combination with the liquid sodium silicate. Its presence renders the coating less brittle than when sodium silicate alone is used as a binder.

When the ingredients of the above referred to flux paste are ground to a fine powder and mixed with the gum arabic and liquid sodium silicate and water they form a smooth paste which is capable of permeating the interstices of a tape or readily mixing with the comminuted cellulosic materials forming part of the flux coating of an electrode. The paste is non-fibrous and non-crystalline. The amorphous silica increases the bulk of the flux for a given weight so that flux coatings of substantial thickness may be employed without obtaining a large amount of slag on the weld metal during the welding operation. Its presence in the flux also corrects the high soda content of the sodium silicate glass. The use of a low melting point glass such as used in this flux gives a slag that covers the entire weld and yet is very light in weight. This reduces to a minimum depressions formed in the weld due to the slag covering. The magnesium silicate present in the talc or asbestos renders the slag capable of picking up large amounts of iron oxide. The magnesium carbonate present in the "Vermont talc" furnishes a large supply of carbon dioxide about the arcing terminal of the electrode and the molten metal of the weld. The ferromanganese is a deoxidizer and may be replaced by other metallic deoxidizers.

Disregarding the presence of gum arabic and cellulosic material in the flux coating its anhydrous composition is substantially as follows:

| | Per cent by weight |
|---|---|
| Titanium dioxide | 20 |
| Sodium silicate glass | 23 |
| Vermont talc | 12 |
| Asbestos | 8 |
| Amorphous silica | 8 |
| Ferromanganese | 15 |
| Sodium silicate | 14 |

Neglecting the combustible materials and minor impurities in the flux, its anhydrous composition expressed in percentage of chemical radicals present therein, is substantially as follows:

| | Per cent by weight |
|---|---|
| $SiO_2$ | 42 |
| $Al_2O_3$ and $Fe_2O_3$ | 1 |
| $TiO_2$ | 20 |
| FeMn | 15 |
| $Na_2O$ | 11 |
| MgO | 7 |
| $CO_2$ | 3 |

When welding boiler plate of fire box quality with a ferrous electrode having a core of the following composition:

| | |
|---|---|
| Carbon | .13–.18% |
| Manganese | .40–.60% |
| Phosphorous | .04% Max. |
| Sulphur | .04% Max. |
| Silicon | .025% Max. |
| Iron | Remainder | and a flux coating such as specifically described above welds of the following physical characteristics are obtainable:

| | |
|---|---|
| Ult. tensile—lb./sq. in | 60,000–75,000 |
| Yield point—lb./sq. in | 40,000–60,000 |
| Elongation—% in 2 inches | 20–35 |
| Red. of area—% | 30–65 |
| Free bend—% | 30–65 |
| Specific gravity | 7.82–7.85 |
| Charpy—ft. lb | 23–45 |

These values were obtained when using direct current with the electrode connected to the positive terminal of the source of supply. Welds made with a coated electrode of the character above described meets the rigid specifications required by the American Society of Mechanical Engineers Boiler Code for Class 1 welds in the flat, vertical and overhead positions.

The electrode illustrated in the drawing is a short length rod such as would usually be employed in hand welding operations. The upper end of the electrode has been bared of flux in order to adapt it for use in an electrode holder by means of which welding current is supplied thereto. Electrodes may be made in accordance with my invention in long lengths for use in automatic or semi-automatic machines by means of which it is fed toward and away from the work to strike and thereafter maintain a welding arc by means of a mechanism which functions in response to a characteristic of the welding arc such as its current or voltage. In such automatic machines the welding current may be supplied to the electrode through incisions or openings made in the flux coating.

It is, of course, apparent that a flux of the composition above specified will produce beneficial results whether it is applied to the electrode as a coating in the manner described above or associated therewith in any other suitable manner. For example, the flux may be enclosed within a channel within the electrode or placed in grooves or depressions on the surface of the electrode without departing from our invention. Furthermore, it is not always necessary to use a cellulosic material as an ingredient of the flux coating.

Although the above described electrode works best in most cases when connected to the positive terminal of the source of supply, there are times when the welding operation should be performed with the electrode connected to the negative terminal of the source of supply. Especially is this so when welding thin metals with small size electrodes.

What we claim as new and desire to secure by Letters Patent of the United States is:

1. A welding electrode having a flux coating the anhydrous composition of which expressed in percentages of chemical radicals present therein is substantially as follows:

| | Per cent by weight |
|---|---|
| $SiO_2$ | 42 |
| $Al_2O_3$ and $Fe_2O_3$ | 1 |
| $TiO_2$ | 20 |
| FeMn | 15 |
| $Na_2O$ | 11 |
| MgO | 7 |
| $CO_2$ | 3 |

2. A welding electrode having the flux coating resulting from applying thereto substantially the following composition:

| | Per cent by weight |
|---|---|
| Titanium dioxide | 12 |
| Sodium silicate glass | 15 |
| Vermont talc | 7 |
| Asbestos | 5 |
| Amorphous silica | 5 |
| Gum arabic | 5 |
| Metallic deoxidizer | 10 |
| Liquid sodium silicate | 24 |
| Water | 17 |

3. A welding electrode having a coating, 15 to 25 per cent of its total weight being cellulosic material impregnated with a material the anhydrous composition of which is substantially as follows:

| | Per cent by weight |
|---|---|
| Titanium dioxide | 20 |
| Sodium silicate glass | 23 |
| Vermont talc | 12 |
| Asbestos | 8 |
| Amorphous silica | 8 |
| Ferromanganese | 15 |
| Sodium silicate | 14 |

4. A ferrous rod having a heavy coating of substantially uniform composition, 15 to 25 per cent of which is formed of cellulosic material and the remainder of which is formed of a material the anhydrous composition of which is substantially as follows:

| | Per cent by weight |
|---|---|
| Titanium dioxide | 20 |
| Sodium silicate glass | 23 |
| Vermont talc | 12 |
| Asbestos | 8 |
| Amorphous silica | 8 |
| Ferromanganese | 15 |
| Sodium silicate | 14 |

5. A heavy coated electrode comprising a core of ferrous metal enclosed in a fabric covering formed of cellulosic material impregnated with a material having substantially the following composition:

| | Per cent by weight |
|---|---|
| Titanium dioxide | 20 |
| Sodium silicate glass | 23 |
| Vermont talc | 12 |
| Short fiber asbestos | 8 |
| Amorphous silica | 8 |
| Ferromanganese | 15 |
| Sodium silicate | 14 |

JOSEPH H. HUMBERSTONE.
VIRDIS MILLER.